(12) United States Patent
Koutsovasilis et al.

(10) Patent No.: US 11,733,902 B2
(45) Date of Patent: Aug. 22, 2023

(54) INTEGRATING AND INCREASING PERFORMANCE OF DISAGGREGATED MEMORY IN OPERATING SYSTEMS

(71) Applicant: INTERNATIONAL BUSINESS MACHINES CORPORATION, Armonk, NY (US)

(72) Inventors: Panagiotis Koutsovasilis, Dublin (IE); Michele Gazzetti, Dublin (IE); Christian Pinto, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/302,355

(22) Filed: Apr. 30, 2021

(65) Prior Publication Data

US 2022/0350518 A1    Nov. 3, 2022

(51) Int. Cl.
G06F 3/06    (2006.01)

(52) U.S. Cl.
CPC .......... *G06F 3/0647* (2013.01); *G06F 3/0604* (2013.01); *G06F 3/067* (2013.01)

(58) Field of Classification Search
None
See application file for complete search history.

(56) References Cited

U.S. PATENT DOCUMENTS

| | | | |
|---|---|---|---|
| 5,727,150 A | 3/1998 | Laudon et al. | |
| 8,296,496 B2 | 10/2012 | Mogul et al. | |
| 9,910,605 B2 | 3/2018 | Jayasena et al. | |
| RE47,411 E | 5/2019 | Ludwig et al. | |
| 10,401,940 B2 | 9/2019 | Mahindru et al. | |
| 10,915,471 B2 | 2/2021 | Chofleming et al. | |
| 2014/0164669 A1 | 6/2014 | Coglitore et al. | |
| 2015/0052287 A1* | 2/2015 | Venkatasubramanian | G06F 12/0891 711/6 |
| 2017/0168715 A1* | 6/2017 | Eshwarappa | G06F 9/45558 |
| 2018/0267826 A1 | 9/2018 | Abou et al. | |
| 2018/0373553 A1* | 12/2018 | Connor | G06F 9/45558 |
| 2019/0042138 A1* | 2/2019 | Guim Bernat | G06F 3/0647 |
| 2020/0371692 A1 | 11/2020 | Van Doom et al. | |
| 2021/0075633 A1* | 3/2021 | Sen | G06F 13/1689 |

FOREIGN PATENT DOCUMENTS

| | | |
|---|---|---|
| TW | I594183 B | 8/2017 |
| TW | I643073 B | 12/2018 |
| TW | 724095 B | 4/2021 |

OTHER PUBLICATIONS

Sugiyama et al., "Reconfigurable SCM Capacity Identification Method for SCM/NAND Flash Hybrid Disaggregated Storage", (c) 2017, IEEE, p. 1-4.*

(Continued)

*Primary Examiner* — Brian R Peugh
(74) *Attorney, Agent, or Firm* — Griffiths & Seaton PLLC

(57) ABSTRACT

Local memory and disaggregated memory may be identified and monitored for integrating disaggregated memory in a computing system. Candidate data may be migrated between the local memory and disaggregated memory to optimize allocation of disaggregated memory and migrated data according to a dynamic set of migration criteria.

20 Claims, 10 Drawing Sheets

(56) References Cited

OTHER PUBLICATIONS

N. Agarwal, T. F. Wenisch, "Thermostat: Application-Transparent Page Management for Two-Tiered Main Memory", ASPLOS 2017, Apr. 8-12, 2017, Xi'an, China (14 Pages).
A. Lagar-Cavilla et al., "Software-Defined Far Memory in Warehouse-Scale Computers", ASPLOS 2019, Apr. 13-17, 2019, Providence, RI, USA (14 Pages).
Z. Yan et al., "Nimble Page Management for Tiered Memory Systems", ASPLOS 2019, Apr. 13-17, 2019, Providence RI, USA (15 Pages).
C. Pinto et al., "ThymesisFlow: a Software-Defined, HW/SW co-Designed Interconnect Stack for Rack-Scale Memory Disaggregation", MICRO 2020 (13 Pages).
Campello, D. J., "Optimizing Main Memory Usage in Modern Computing Systems to Improve Overall System Performance", (2016) FIU Electronic Theses and Disertations. 2568. Jun. 20, 2016 (114 Pages).
Lim, K. et al., "System-Level Implications of Disaggregated Memory", HP Labs, University of Michigan, Ann Arbor. Jun. 2016. (12 Pages).
Lim, K. et al., "Disaggregated Memory for Expansion and Sharing in Blade Servers", ISCA 2009, Jun. 20-24, 2009, Austin, Texas, USA. (12 Pages).
Anonymous, "Method and Apparatus for Dynamic Distribution of Data among Heterogeneous Memory Units", IPCOM000196350D, Jun. 1, 2010 (2 Pages).
Anonymous, "Programming Language Extensions for Power-Aware Computing on Multi-cores", IPCOM000190829D, Dec. 10, 2009 (15 Pages).

\* cited by examiner

INTEGRATING AND INCREASING PERFORMANCE OF DISAGGREGATED MEMORY IN OPERATING SYSTEMS

BACKGROUND

The present invention relates in general to computing systems, and more particularly, to various embodiments for integrating and improving performance of disaggregated memory in a cloud computing environment using a computing processor.

SUMMARY

According to an embodiment of the present invention, a method for integrating and improving performance of disaggregated memory in a cloud computing environment, by one or more processors, is depicted. Local memory and disaggregated memory may be identified and monitored for integrating disaggregated memory in a computing system. Candidate data may be migrated between the local memory and disaggregated memory according to a dynamic set of migration criteria.

In an additional embodiment, disaggregated memory controller may be initialized (e.g., initialized, active, and/or installed) in a server tray that includes memory domains mapped to local memory. Access to disaggregated memory may be provided by the disaggregated memory controller upon a startup operation of an operating system. A memory balancing service may be initiated upon completion of the startup operation of the operating system Memory pages may be dynamically migrated between the local memory and the disaggregated memory using the memory balancing service.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

Thus, in addition to the foregoing exemplary method embodiments, other exemplary system and computer product embodiments for automated evaluation of robustness of machine learning models under adaptive whitebox adversarial operation are provided.

DETAILED DESCRIPTION OF THE DRAWINGS

Figure 1:
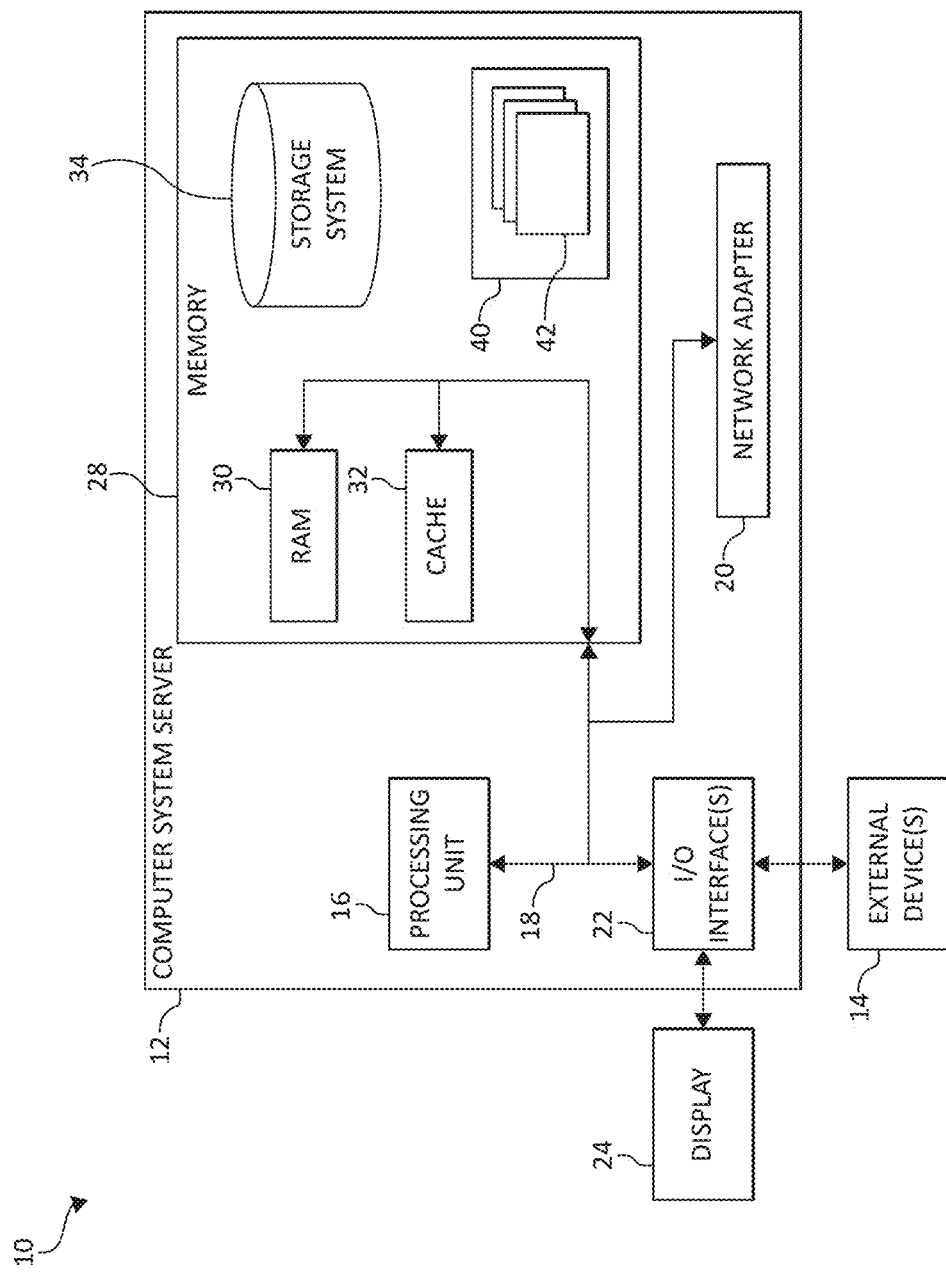
FIG. 1 is a block diagram depicting an exemplary cloud computing node according to an embodiment of the present invention.

The present invention relates generally to the field of disaggregated memory, and more specifically, to disaggregated memory in a cloud computing environment and the like.

Modern cloud workloads are characterized by an increasing demand for memory, linked to the increasing size of the datasets used. A factor that contributes to the ever-increasing memory needs, and results in many memory-hungry applications landing in the cloud landscape, is also the convergence of High Performance Computing ("HPC") and Cloud computing. The combination of the growing memory demands and the vast variety of workloads presents a great obstacle for Cloud infrastructure providers, targeting the perfect balance between computational power and memory, within the boundaries of the single node.

Historically, over-provisioning of the nodes has been the temporary solution, allowing most of the workloads to fit with the resources available on the single nodes. Attempts have been made to provide various software and hardware solutions target to alleviate the resource pressure of over-committing. However, overcommitting fails to provide a long term solution as memory demand is increasing rapidly and no static over-provisioning will be fit for purpose in the near future. One appealing and more definitive solution is the disaggregation of computing resources.

In a disaggregated system, a data center infrastructure may be organized as a pool of resources that can be dynamically composed to form a compute node matching the incoming workloads in terms of computational resources. Physical boundaries are not enforced within a single server board as all composable resources are interfaced via a dedicated network fabric. This paradigm enables also dynamic adaptation during applications runtime, enabling "on-the-fly" attachment/detachment of resources following applications phases while also maximizing the potential for powering off unused resources and re-shuffling assignment across multiple applications.

To fully exploit the potential of dynamically attachable disaggregated memory there is a need for more efficient integration across an entire software stack, ranging from low-level machines' firmware up to the operating system and user-space. Additionally, a need exits to enable cloud computing systems to adopt memory disaggregation for increasing the efficiency of data centers. Current systems fail to address the increased latency of disaggregated memory accesses and integration into existing operating systems.

Accordingly, mechanisms of the illustrated embodiments provide for integrating and improving performance of disaggregated memory in a cloud computing environment by providing disaggregated memory integration in an operating system and orchestrating accesses between local and disaggregated memory. It should be noted that "memory disaggregation" may refer to compute nodes in a cloud computing environment and/or a group of devices (e.g., servers) connected over a dedicated network fabric where each compute node/machine may dynamically borrow memory from any other machine, for the purpose of extending its own main system memory availability. In this way, the cloud computing environment may be transformed into a huge pool of resources that can be orchestrated in software, and connected together to form logical servers that have just the resources needed by a specific workload. Thus, the memory of a system may be extend by hot-plugging memory chunks from a disaggregated memory pool which can easily be upgraded, according to the needs, by the cloud provider.

In one aspect, various embodiments provide a cloud computing system where compute nodes may extend their main memory by borrowing memory from remote nodes. Hardware and/or software extensions may provide for the integration and performance optimization of disaggregated memory into current operating systems. In an additional aspect, disaggregated memory may be consumed and accessed for optimizing performance by existing operating systems. Memory pages may be accessed between local and disaggregated memory, according to how often pages or "hot pages" are accessed, where "hot pages" are those memory pages that are frequently used or accessed as compared to other memory pages that are less frequently used and/or accessed. In so doing, performance of a server-tray that utilizes disaggregated memory may be optimized. The disaggregated memory may be provided as a resource to an Operating System ("OS"). The disaggregated memory may be exposed in such a way that the disaggregated memory may be managed by the OS and the performance penalty of the disaggregated memory may be minimized, reduced, and/or eliminated by migrating frequently accessed memory data to the local memory of a computing system.

In an additional embodiment, various embodiments provide integrating disaggregated memory into a selected operating system (e.g., an open source operating system) by focusing on increasing the utilization of machines under heavy memory load. Disaggregated memory may be integrated with a kernel non-uniform memory access ("NUMA") environment that allows transparent and dynamic allocation of disaggregated memory. Additionally, accesses to disaggregated memory pages may be monitored and memory pages that are "hot" (e.g., frequency accessed) may be identified and autonomously migrated to a local memory from the disaggregated memory. Also, each compute nodes may be monitored and the disaggregated memory may be dynamically hot plugged when a node is under memory pressure.

In general, as used herein, "optimize" may refer to and/or defined as "maximize," "minimize," "best," or attain one or more specific targets, objectives, goals, or intentions. Optimize may also refer to maximizing a benefit to a user (e.g., maximize a trained machine learning pipeline/model benefit). Optimize may also refer to making the most effective or functional use of a situation, opportunity, or resource.

Additionally, optimizing need not refer to a best solution or result but may refer to a solution or result that "is good enough" for a particular application, for example. In some implementations, an objective is to suggest a "best" combination of operations and/or machine learning models/machine learning pipelines, but there may be a variety of factors that may result in alternate suggestion of a combination of operations and/or machine learning models yielding better results. Herein, the term "optimize" may refer to such results based on minima (or maxima, depending on what parameters are considered in the optimization problem). In an additional aspect, the terms "optimize" and/or "optimizing" may refer to an operation performed in order to achieve an improved result such as reduced execution costs or increased resource utilization, whether or not the optimum result is actually achieved. Similarly, the term "optimize" may refer to a component for performing such an improvement operation, and the term "optimized" may be used to describe the result of such an improvement operation.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
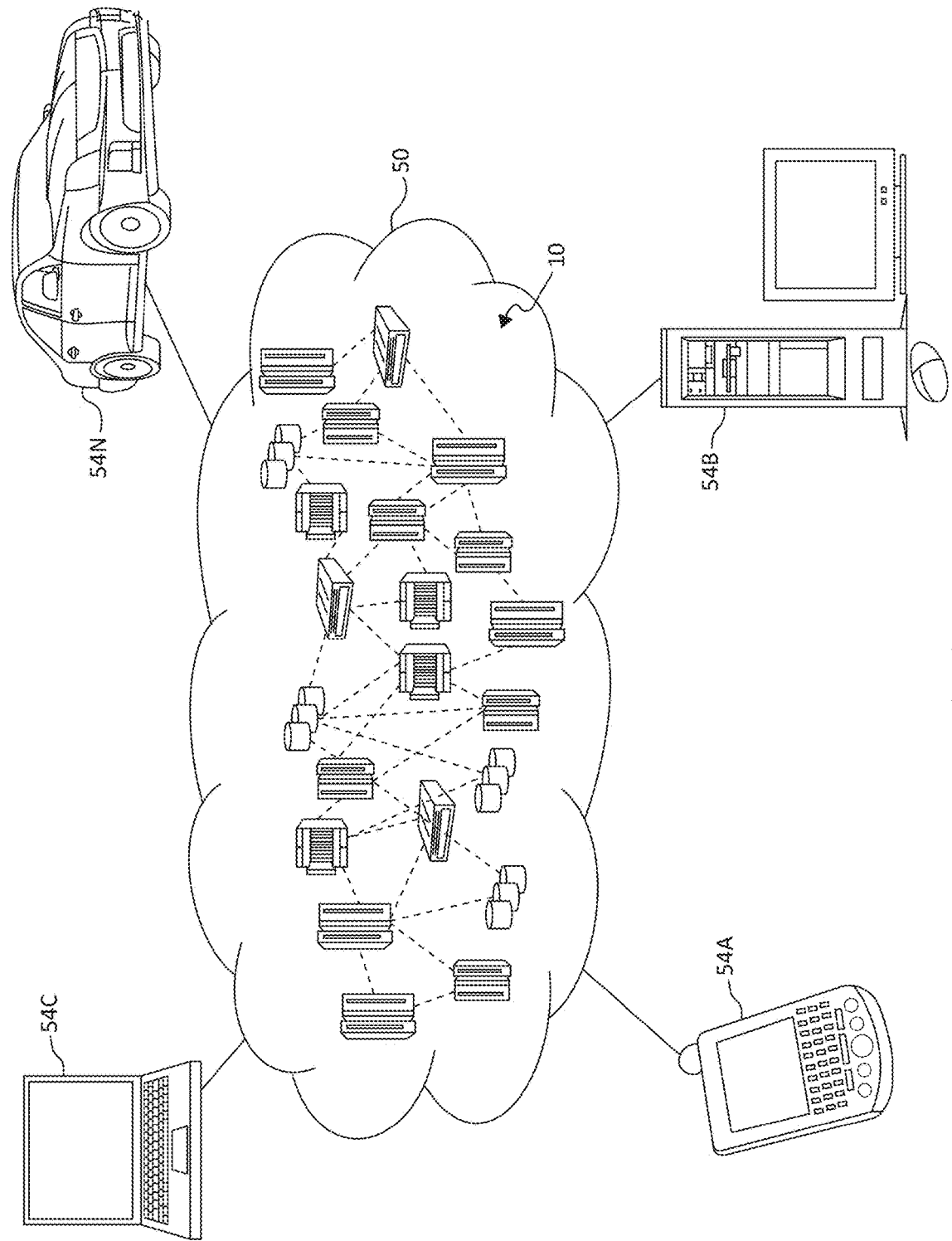
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
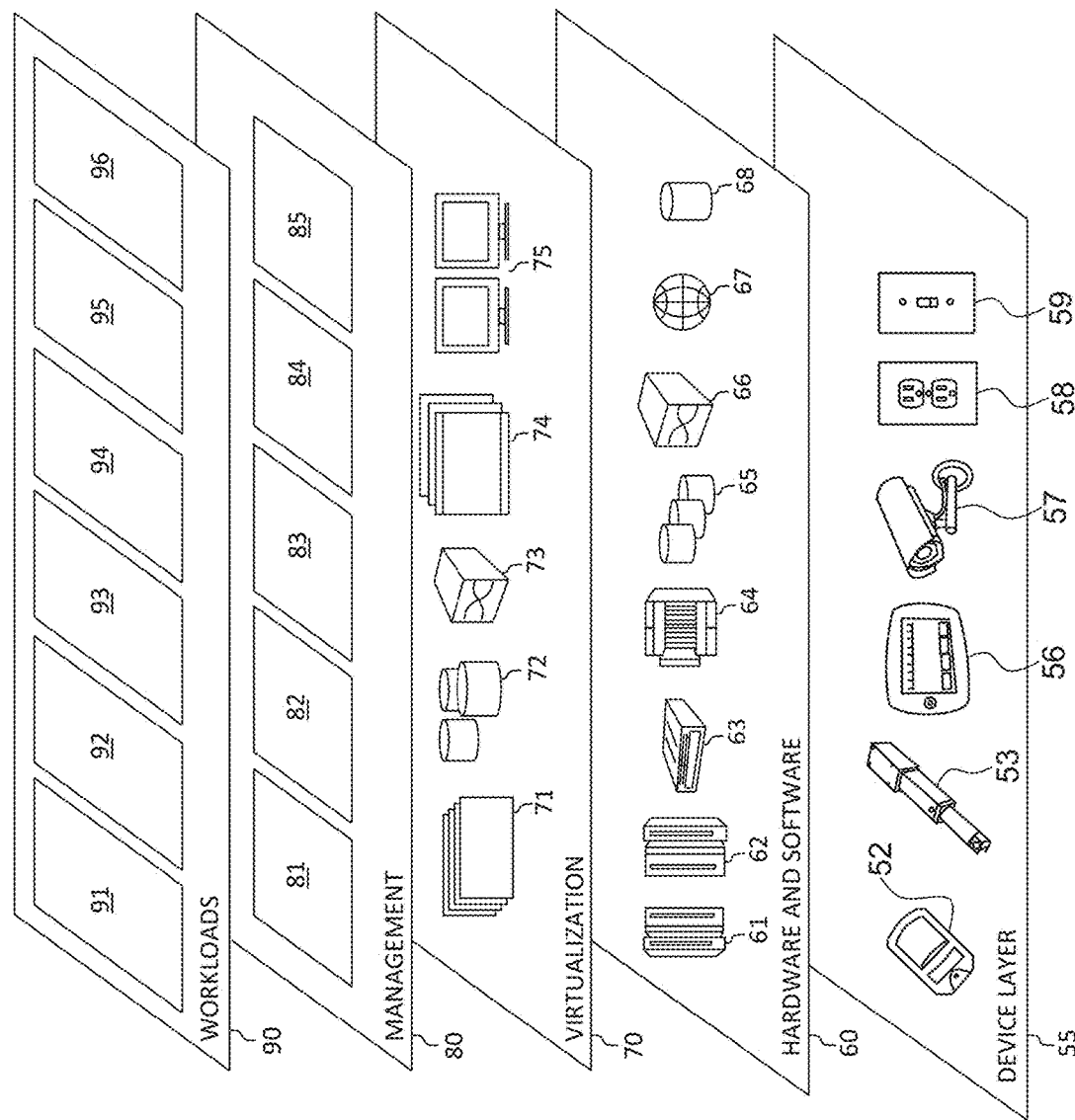
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for integrating and improving performance of disaggregated memory in a computing environment (e.g., in a neural network architecture). In addition, workloads and functions 96 for integrating and improving performance of disaggregated memory in a computing environment may include such operations as analytics, deep learning, and as will be further described, user and device management functions. One of ordinary skill in the art will appreciate that the workloads and functions 96 for integrating and improving performance of disaggregated memory in a computing environment may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously stated, the present invention provides novel solutions for integrating and improving performance of disaggregated memory in a computing environment by one or more processors in a computing system. Local memory and disaggregated memory may be identified and monitored for integrating disaggregated memory in a computing system. Candidate data may be migrated between the local memory and disaggregated memory according to a dynamic set of migration criteria.

That is, the mechanisms of the illustrated embodiments exposes disaggregated memory in such a way that can be seamlessly consumed by existing operating systems and enables disaggregated memory to be compatible with all the built-in operating systems. In this way, memory may be balanced between local memory domains and disaggregated memory domains. The performance penalty induced by disaggregated memory may be minimized and/or eliminated.

Figure 4:
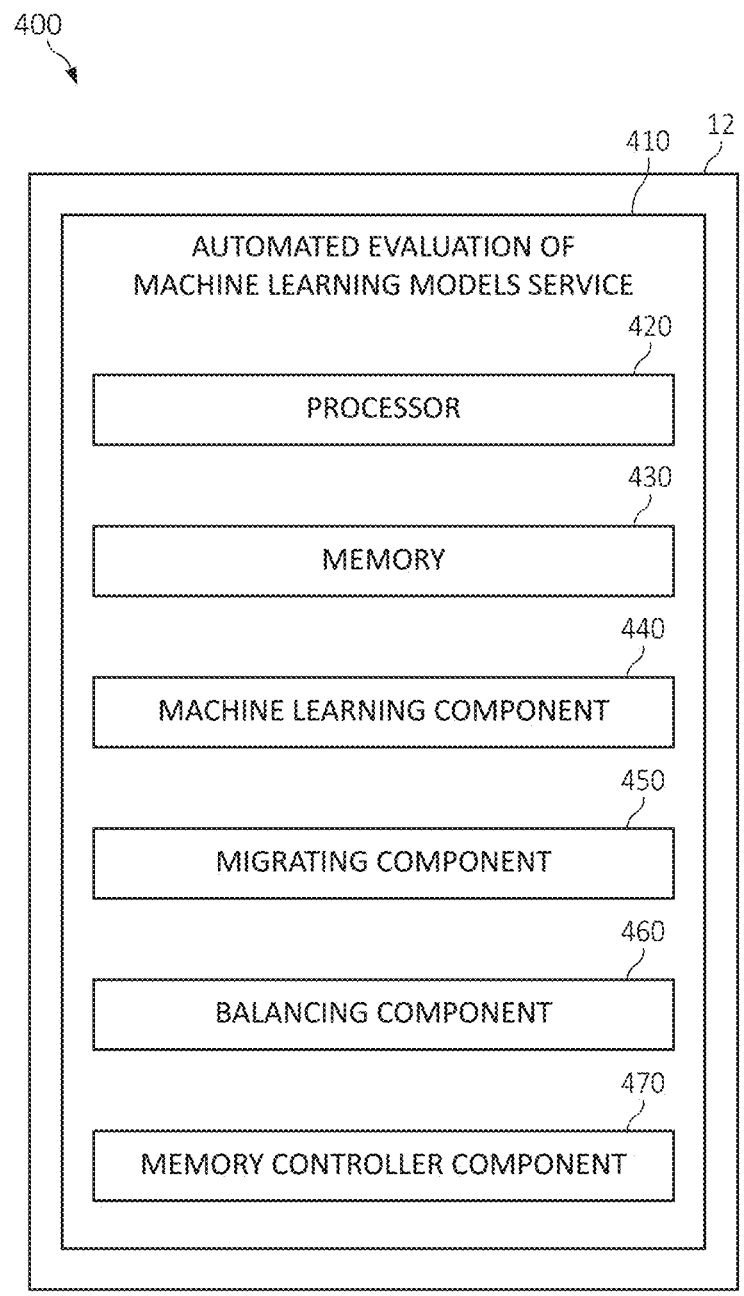
FIG. 4 is an additional block diagram depicting an exemplary functional relationship between various aspects of the present invention.

Turning now to FIG. 4, a block diagram depicting exemplary functional components of system 400 for integrating and improving performance of disaggregated memory in a computing environment according to various mechanisms of the illustrated embodiments is shown. In one aspect, one or more of the components, modules, services, applications, and/or functions described in FIGS. 1-3 may be used in FIG. 4. As will be seen, many of the functional blocks may also be considered "modules" or "components" of functionality, in the same descriptive sense as has been previously described in FIGS. 1-3.

An disaggregated memory integration service 410 is shown, incorporating processing unit 420 ("processor") to perform various computational, data processing and other functionality in accordance with various aspects of the present invention. In one aspect, the processor 420 and memory 430 may be internal and/or external to the disaggregated memory integration service 410, and internal and/or external to the computing system/server 12. The disaggregated memory integration service 410 may be included and/or external to the computer system/server 12, as described in FIG. 1. The processing unit 420 may be in communication with the memory 430. The disaggregated memory integration service 410 may include a machine learning component 440, a migration component 450, a balancing component 460, and a memory controller component 470.

In one aspect, the system 400 may provide virtualized computing services (i.e., virtualized computing, virtualized storage, virtualized networking, etc.). More specifically, the system 400 may provide virtualized computing, virtualized storage, virtualized networking and other virtualized services that are executing on a hardware substrate.

The disaggregated memory integration service 410, using migration component 450 and/or the memory controller component 470, may dynamically identify and monitor both local memory and disaggregated memory, wherein the local memory and disaggregated memory are controlled by an operating system and migrate candidate data between the local memory and disaggregated memory according to a dynamic set of migration criteria.

The migration component 450 may migrate the candidate data between different memory tiers of the local memory or the disaggregated memory. The balancing component 460 may balance the candidate data between the local memory and disaggregated memory based on access frequency of the candidate data. Also, it should be noted that the local memory and the disaggregated memory include a variety of memory types and performance characteristics.

The migration component 450 and/or the memory controller component 470 may minimize a performance penalty of the disaggregated memory by migrating the candidate data from the disaggregated memory to the local memory. The memory controller component 470 may control the local memory and disaggregated memory by an operating system and rank available memory domains associated with the local memory and disaggregated memory based on the dynamic set of migration criteria.

The machine learning component 440 may determine computational performance from each of the local memory and disaggregated memory based on migrating the candidate data between the local memory and disaggregated memory. The dynamic set of migration criteria may include access frequency of the candidate data, access latency of the candidate data, and performance characteristics of the various memory types. The machine learning component 440 may also collect feedback information from the local memory and the disaggregated memory and adjust the dynamic set of migration criteria based on the feedback information.

In one aspect, the machine learning component 440 as described herein, may perform various machine learning operations using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are within the scope of this disclosure. Also, when deploying one or more machine learning models, a computing device may be first tested in a controlled environment before being deployed in a public setting. Also even when deployed in a public environment (e.g., external to the controlled, testing environment), the computing devices may be monitored for compliance.

Figure 5A:
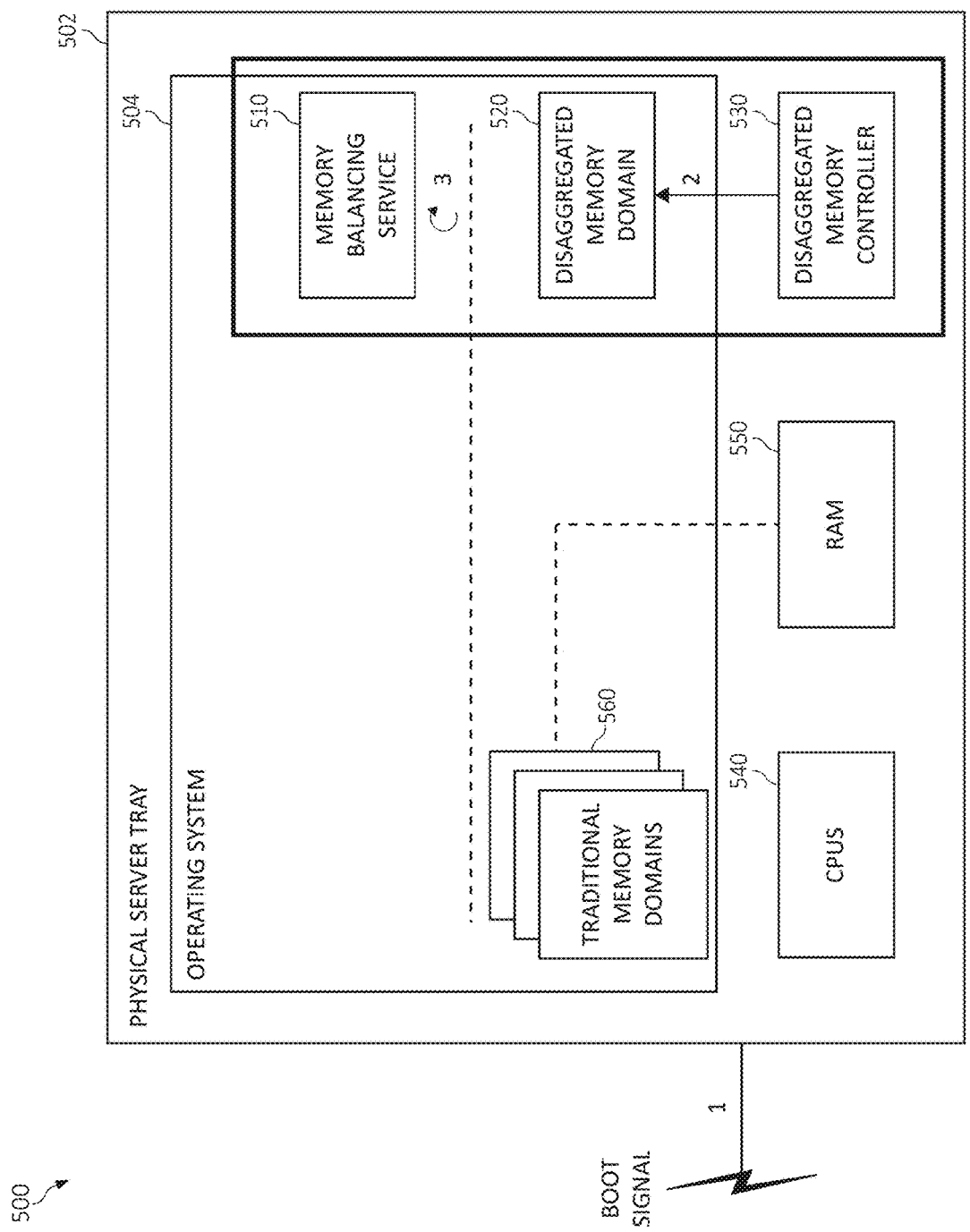
FIGS. 5A-5B depict block flow diagram depicting operations for integrating and improving performance of disaggregated memory in a computing environment according to an embodiment of the present invention.
Figure 5B:
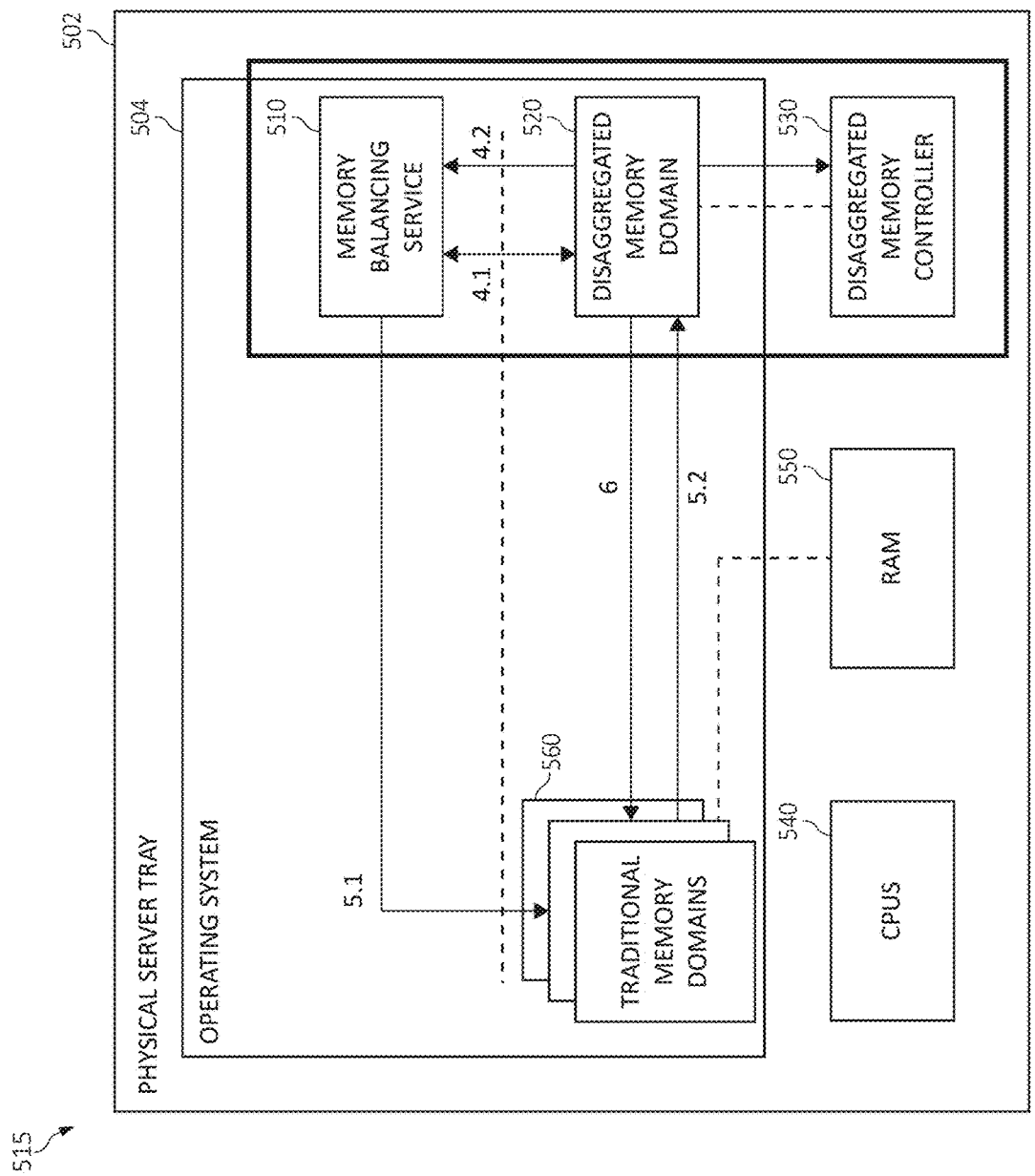

Turning now to FIGS. 5A-5B, block diagram depicts exemplary operations for integrating disaggregated memory in a cloud computing environment. In one aspect, one or more of the components, modules, services, applications, and/or functions described in FIGS. 1-4 may be used in FIGS. 5A-5B. As shown, various blocks of functionality are depicted with arrows designating the blocks' of system 500 relationships with each other and to show process flow (e.g., steps or operations). Additionally, descriptive information is also seen relating each of the functional blocks' of system 500.

As will be seen, many of the functional blocks may also be considered "modules" of functionality, in the same descriptive sense as has been previously described in FIGS. 1-4. Repetitive description of like elements employed in other embodiments described herein is omitted for sake of brevity.

With the foregoing in mind, the module blocks' of systems 500 and 515 may also be incorporated into various hardware and software components of a system integrating disaggregated memory in a cloud computing environment in accordance with the present invention. Many of the functional blocks of systems 500 and 515 may execute as background processes on various components, either in distributed computing components, or elsewhere.

A physical server tray 502 is shown, incorporating an operating system 504, one or more CPU's 540, RAM 550, and a disaggregated memory controller 530, each of which may be in communication with each other. The operating system 504 may include a memory balancing service 510, one or more disaggregated memory domain 520, and/or a local memory domain 560.

The disaggregated memory domain 520 may software-based, hardware-based or a combination thereof. The disaggregated memory domain 520 may be associated with one or more different physical address ranges and exposed as a regular memory domain to the operating system 504.

The disaggregated memory controller 530 may also be software-based, hardware-based or a combination thereof. The disaggregated memory controller 530 may expose disaggregated memory as a disaggregated memory domain such as, for example, the disaggregated memory domain 520.

The memory balancing service 510 is enabled to map to various types of memory such as, for example, a local memory (DRAM), High Bandwidth Memory (HBM) devices, and/or disaggregated memory.

The memory balancing service 510 may be responsible and/or tasked for migrating candidate memory data to different memory tiers and optimizing computational performance. The memory balancing service 510 may monitor the impact of collected metrics related to the computational performance relating to the migration of the candidate memory and use feedback data to adjust or correct future migration criteria of memory data. The memory balancing service 510 may support operations at process level and system-wide level in a cloud computing environment. The memory balancing service 510 may rank available memory domains based on performance related metrics such as, for example, access frequency and/or access latency.

In operation, as depicted in FIG. 5A, starting in step 1) a boot signal may be provided to boot the physical server tray 502 from an administrator and/or a peripheral computing device/CPU. The attributes and/or characteristics of the physical server tray 502 may include 1) the physical server tray 502 is associated/part of a disaggregated memory capable of a cloud computing infrastructure. The disaggregated memory controller 530 may be installed in the physical server tray 502. The physical server tray 502 may include a number of memory domains (e.g., traditional memory domains) mapped to locally attached memory devices such as, for example, RAM, dynamic random access memory ("DRAM"), and/or high band width memory ("HBM"), etc.).

It should be noted that local memory be, for example, RAM, DRAM, and/or HBM memory fixed to a computer system and disaggregated memory may be considered as remote memory that is not fixed to the computer system. Rather, the disaggregated memory is memory that can be allocated/de-allocated to/from the computer system from any other source (e.g., a compute node of in a cloud computing infrastructure that may be in communication with the computer system having the RAM fixed thereto.) In one aspect, the disaggregated memory domain may comprise any remote physical memory that can be allocated and/or shared with the local memory or local computer yet can be allocated dynamically to another computer or purpose. In some embodiments, the disaggregated memory domain may comprise physical memory that is physically located within the same or different blade, rack or pool of devices. In some embodiment, the disaggregated memory domain may comprise virtual memory that may that can be allocated and/or shared with the local memory or local computer.

In an additional aspect, the disaggregated memory domain may comprise compute nodes in a cloud computing environment and/or a group of devices (e.g., servers) connected over a dedicated network fabric where each compute node/machine may dynamically "borrow" memory from any other machine, for the purpose of extending its own main system memory availability. In this way, the computing environment may be transformed into a huge pool of resources that can be orchestrated in software, and connected together to form logical servers that have just the resources needed by a specific workload. Thus, the local memory of the computer may be extended by hot-plugging memory chunks from the disaggregated memory pool In step 2, one or more disaggregated memory domains 520 may be exposed to the operating system 504. That is, the disaggregated memory controller 530 may expose the memory domains such as, for example, one or more disaggregated memory domain 520 at the initialization phase of the operating system 504. For example, at creation time, each disaggregated memory domain 520 may be assigned without remote memory and a selected amount of memory in the memory domain 560 for successfully allocating mandatory operating software data structures for managing a memory domain. Disaggregated memory may be attached to the disaggregated memory domain 520 when creation of the disaggregated memory domains 520 is completed. The disaggregated memory domain 520 may also be referred to as "hybrid memory domains."

In step 3, while the operating software ("OS") completes booting up process, the memory balancing service 510 may be initiated. The initialization of the memory balancing service 510 may be provided by either a user-space or kernel-space system service. The memory balancing service 510 balances each of memory pages between the memory domains 560 (e.g., local or "traditional" memory domains) and the disaggregated memory domains 520.

Once the initialization of memory balancing service 510 is completed, the memory balancing service 510 (initiated in step 3) may begin checking, identifying, and/or searching for memory pages in the disaggregated memory domains 520 that are frequently accessed ("hot" pages), as depicted in FIG. 5B. Again, "hot memory pages" may be those memory pages that are frequently used or accessed as compared to other memory pages that are less frequently used and/or accessed.

Determining which memory pages are "hot" may be provided from the operating system 504 (e.g., built in component of the operating system 504), as depicted in step 4.1 using the memory balancing service 510 and/or the disaggregated memory controller 530, as in step 4.2, or a synergistic deployment of both the memory balancing service 510 and/or the disaggregated memory controller 530.

When memory pages classified as "hot memory pages," the memory balancing service 510 may determine whether there is a sufficient amount of free space in the local memory domains 560, as in step 5.1, to host the "hot" memory pages of the disaggregated memory domains 520.

In step 5.2, in the event there is an inadequate amount of the free space, the memory balancing service 510 may create free space by migrating local memory pages that are infrequently accessed (e.g., "cold memory pages") from the local memory domains 560 to the disaggregated memory domains 520. Determining those memory pages that are "cold" may be provided from the operating system 504 (e.g., built in component of the operating system 504) in a polling fashion by the memory balancing service 510 or a synergistic deployment of both the memory balancing service 510 and/or the disaggregated memory controller 530.

In step 6, the memory balancing service 510 may migrate the "hot" memory pages from the disaggregated memory controller 530 to the local memory domains 560.

Figure 6:
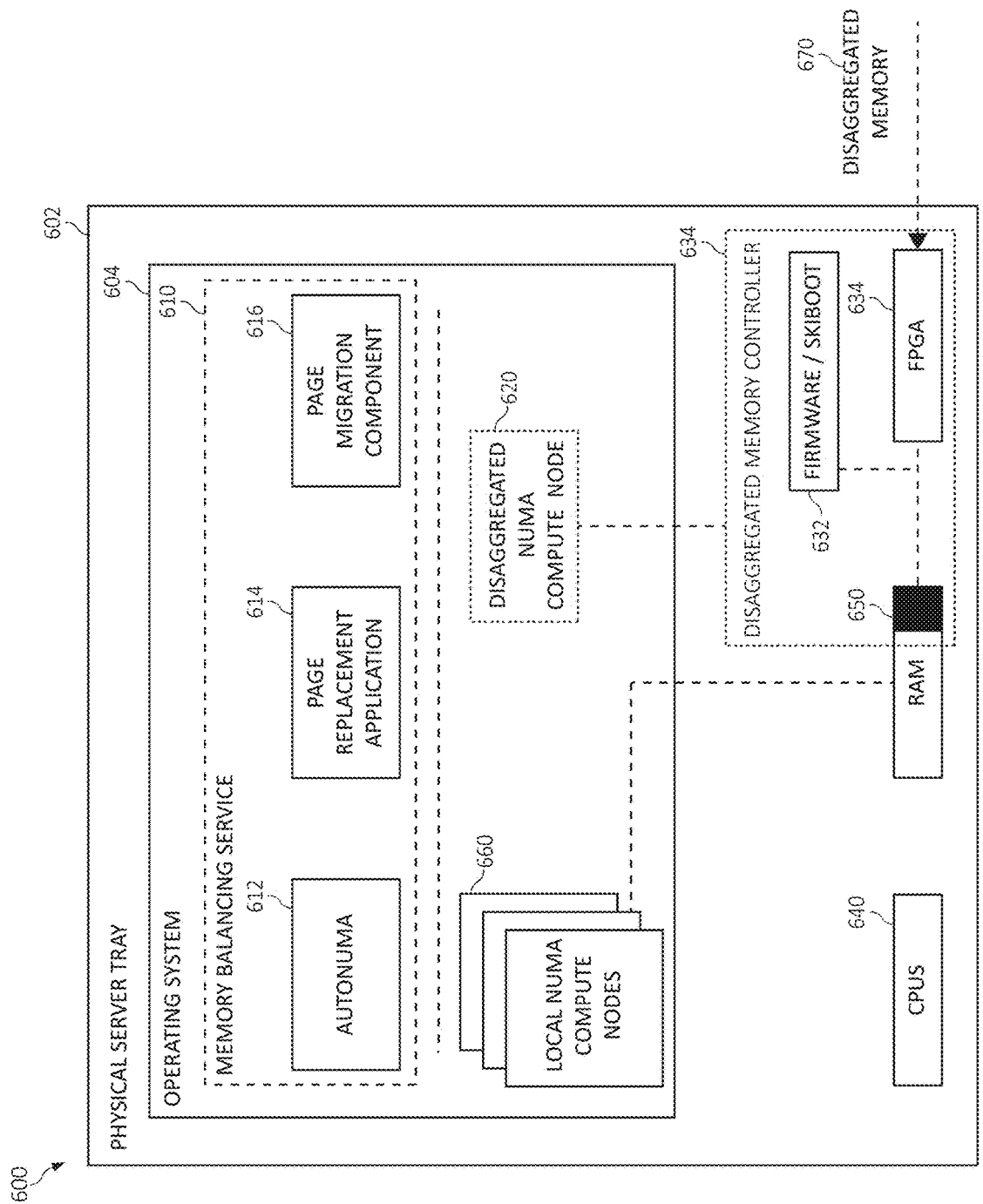
FIG. 6 depicts an additional block flow diagram depicting operations for integrating and improving performance of disaggregated memory in a computing environment according to an embodiment of the present invention.

Turning now to FIG. 6, a block diagram depicting exemplary functional components of system 600 for integrating and improving performance of disaggregated memory in a cloud computing environment. In one aspect, one or more of the components, modules, services, applications, and/or functions described in FIGS. 1-5A-5B may be used in FIG. 6. Repetitive description of like elements employed in other embodiments described herein is omitted for sake of brevity.

Again, a physical server tray 602 is shown, incorporating an operating system 604, one or more CPU's 640, RAM 650, and a disaggregated memory controller 630, each of which may be in communication with each other. The operating system 604 may include a memory balancing service 610, one or more disaggregated NUMA compute node 620, and/or one or more local NUMA compute nodes 660 (e.g., local memory).

The memory balancing service 610 may include an autoNUMA 612, a page replacement application 614, and a page migration component 616. In one aspect, the NUMA may be a computer memory design used in multiprocessing where the memory access time depends on memory location relative to a processor. The disaggregated memory controller 630 may include firmware 632, an FPGA 634, along with in association with all and/or a portion of RAM 650. The disaggregated memory controller 630 may be in direct communication/association with disaggregated memory 670. In one aspect, the disaggregated memory 670 may be one of a variety of types of memory with each memory having various and/or different performance characteristics.

In operation, memory balancing service 610 may be implemented using a combination of the AutoNUMA 612, the page replacement application 614, and the page migration component 616. The AutoNUMA 612 may identify "hot" memory pages. For example, the AutoNUMA 612 may identify "hot" memory pages in the local NUMA nodes 660 (e.g., local NUMA compute nodes).

The page replacement application 614 and the page migration component 616 may be are used for implementing the allocation and migration of candidate data (in case there was enough memory in the local domain) such as, for example, memory pages. That is, the page replacement application 614 and the page migration component 616 may identify "cold local memory pages" and swapping the "cold local memory pages" with the "hot disaggregated memory pages" such as, for example, in the event the local NUMA compute nodes 660 does not have enough free memory pages. The local NUMA compute nodes 660 (e.g., local memory domains) and the disaggregated NUMA compute node 620 (e.g., disaggregated memory domains) may be materialized as the NUMA memory nodes. The disaggregated memory controller 630 may be implemented via a full stack memory disaggregation prototype for memory disaggregation of various disaggregated memory 670 and a modified version of the firmware 632 for various types of systems/power systems.

To further illustrated the operations of the embodiments of FIG. 6, consider the following.

In one aspect, the firmware 632 (e.g., skiboot) for the disaggregated memory controller 634 provides control and exposes necessary information of an underlying system hardware to the higher software layers, such as a kernel. The firmware 632 may create a device tree, which the kernel parses at boot time. Among other features, the device tree may include an entry for each memory in the system that the Kernel assigns to the corresponding NUMA node based-on the chip-id field. To allow the "hotplugging" of disaggregated memory 670, the firmware 632 creates a CPU-less NUMA node such as, for example, the disaggregated NUMA compute node 620. The disaggregated NUMA compute node 620 acts as a placeholder for disaggregated memory 670, which may be attached at runtime.

In one aspect, the disaggregated NUMA compute node 620 may be created with a "usable-memory" property set to "zero." This instructs a kernel that no usable memory is available at the disaggregated NUMA compute node 620, and none of the data structures used to handle memory allocations should be created. This is needed because disaggregated memory is materialized via a custom FPGA 634 design that is configured after the machine has booted.

Allowing a kernel to use that memory during boot, before the appropriate configuration of the FPGAs 634, would result in the immediate crash of the machine. However, this property has a drawback: the kernel cannot allocate memory from that disaggregated NUMA compute node 620 even after the machine has booted and the FPGAs are configured. Having the "usablememory" property set to zero is not only instructing the kernel not to use that memory, but it also prevents other components, such as the AutoNUMA 612, to properly work on the disaggregated NUMA compute node 620 where the disaggregated memory 670 may be mapped. To bypass the limitation of dynamic attachment of memory upon need in the node (i.e., high memory pressure) in this scenario, the firmware 632 may transform and/or create the disaggregated NUMA compute node 620 as a hybrid NUMA node that includes a portion of local memory (e.g., 1 gigabyte "GB" of the local NUMA compute nodes 660) and the disaggregated memory 670. This is achieved by reserving a portion of local memory and assigning it to the same the disaggregated NUMA compute node 620 that is used for the disaggregated memory 620. The resulting the disaggregated NUMA compute node 620 that is a hybrid disaggregated NUMA compute node may be span two regions of the physical address space: 1) the area where the reserved local memory is mapped, and 2) a region where the disaggregated is mapped through the FPGA 632.

As a result, the limitations induced by the designation of "usable-memory" property is minimized and reduced, and a kernel of a computer is enabled to properly the disaggregated NUMA compute node 620 for memory allocations.

In addition, give the customization feature of the firmware 632 of the disaggregated memory controller 634, a kernel of a computing system may allocate memory from every disaggregated NUMA compute node 620 in a cloud computing environment, including one of the disaggregated NUMA compute node 620 hosting the disaggregated memory 670.

Thus, the memory balancing service 610 may then balance usage of local and disaggregated memory by migrating frequently accessed pages to the former, and demoting the less frequently accessed ones to the latter. These changes aim to avoid swapping to disk in favor of using disaggregated memory, and target to keep frequently accessed memory pages to local memory.

Also, to achieve both elimination of swapping and balancing of candidate data (e.g., memory pages) across the local NUMA compute nodes 660 (e.g., local memory domains) and the disaggregated NUMA compute nodes 620 (e.g., disaggregated memory domains), the page replacement application 614 may be customized and used.

For example, the page replacement application 614 may maintain two page lists per NUMA node, namely an active list and an inactive list. The active list references the memory pages considered as necessary (e.g., "hot memory pages"). The inactive list maintains the pages that are considered candidates for memory reclaiming (e.g., "cold memory pages").

When active list pages reach the bottom of the list, based-on the clock algorithm the page replacement application 614 ma checks whether the page referenced bit is set. In the case the bit is set, the memory page may reach the top of the active list. Otherwise, the memory page is transferred and moved to the inactive list.

Under memory pressure, the kernel tries to shrink the inactive list by swapping out the respective pages. The shrinking of inactive list can be triggered either by a swap or by a memory allocation failure due to insufficient free memory. When the system is under memory pressure, the memory pages may be migrated using the page migration component 616 from the inactive list of local memory to the active list of disaggregated memory.

It should be noted that migrating the pages, instead of swapping out, is applied only to pages in NUMA nodes hosting local memory. When the page replacement application 614 needs to shrink the inactive list of the hybrid NUMA node, memory pages in disaggregated memory 670 may be swapped out to a disk. Contrary to a swap, having memory pages demoted to disaggregated memory 670 is not bringing them back to local memory. For this reason, the memory balancing service 610 re-balances the pages, by transferring frequently accessed memory pages, that reside in the disaggregated memory 670, back to local memory (e.g., the local NUMA compute nodes 660).

Moreover, because the memory needs of a workload vary over time and may exceed the available memory of the node, the memory balancing service 610 and/or the disaggregated memory controller 634 may monitor the state of local memory and disaggregated memory and may balance/scales the amount of the attached disaggregated memory 670 according to the current memory pressure (e.g., a rate or percentage "%" of memory used) of a particular compute node. For example, the memory balancing service 610 may collect data and metrics for the local memory and disaggregated memory domains. Based on this data, the memory balancing service 610 and/or the disaggregated memory controller 634 may hotplugs and/or unplugs the disaggregated memory 670 to/from the local memory. As soon as the memory balancing service 610 and/or the disaggregated memory controller 634 identifies that a machine is either under memory pressure or has a large surplus of attached disaggregated memory, the memory balancing service 610 and/or the disaggregated memory controller 634 contacts the computing device of the local memory for modifying the state of the machine. When the disaggregated memory 670 needs to be hot plugged, the memory balancing service 610 identifies a donor compute node and passes to local computing system all the necessary information to proceed with the hotplug.

Figure 7:
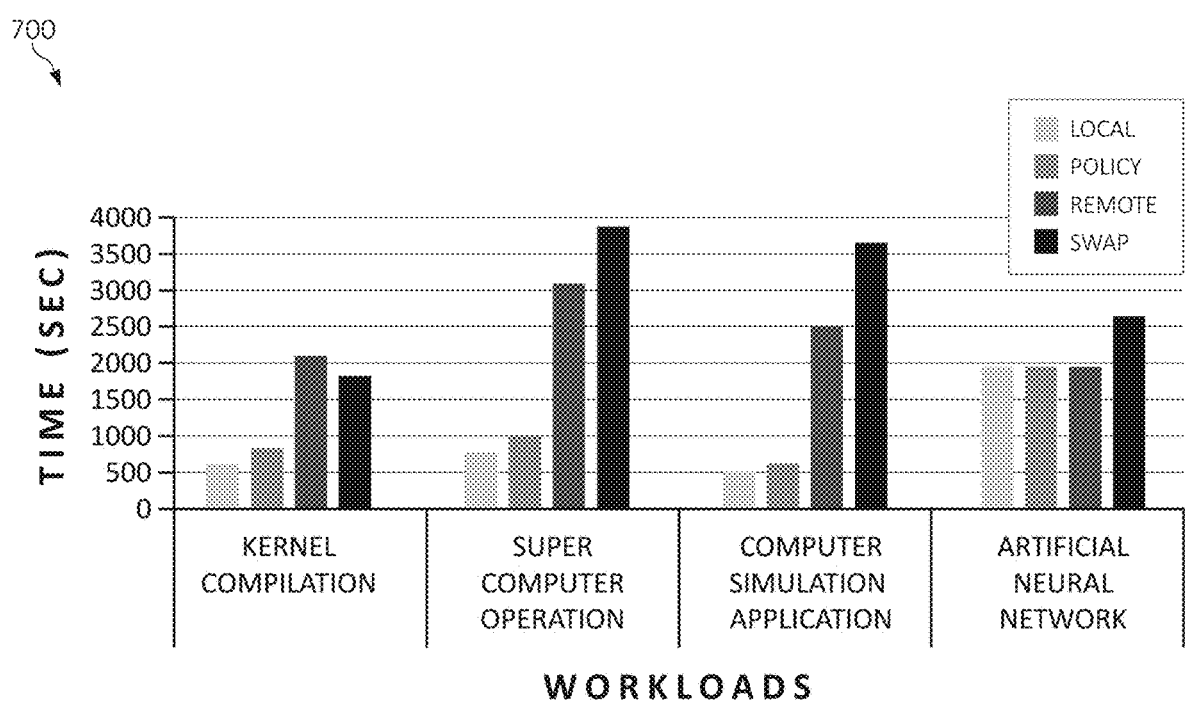
FIG. 7 is a graph diagram illustrating performance of various application results of integrating and improving performance of disaggregated memory according to an embodiment of the present invention.

Turning now to FIG. 7, graph 700 depicts application results of integrating and improving performance of disaggregated memory according to an embodiment of the present invention. Graph 700 depicts performance of the illustrated embodiments described herein (e.g., the policy) are compared when executing simultaneously four applications compared to using only local memory (local), only disaggregated memory (remote) and existing disk-based mechanisms (swap)

That is, graph 700 depicts performance of each application over a time period (e.g., 500-4000 seconds ("sec") in 500 second increments, such as, for example, a kernel compilation, a super computer operation, a computer simulation application, and an artificial network ("ANN") training (e.g., ResNet training) when using local memory (local), a system software stack (policy), only disaggregated memory (e.g., remote memory) and a swap (swap).

As expected the local outperforms any other campaign. The second most performant campaign is policy, 13% slower, on average, compared to local, and 46% and 57% faster, on average, compared to remote and swap, respectively. Noticeably, except for the kernel compilation, remote is faster by 34% on average compared with swap. These results indicate that introducing and exploiting disaggregated memory through a system software stack may yield comparable performance levels to local, effectively increasing the CPU utilization of a node under memory pressure.

Figure 8:
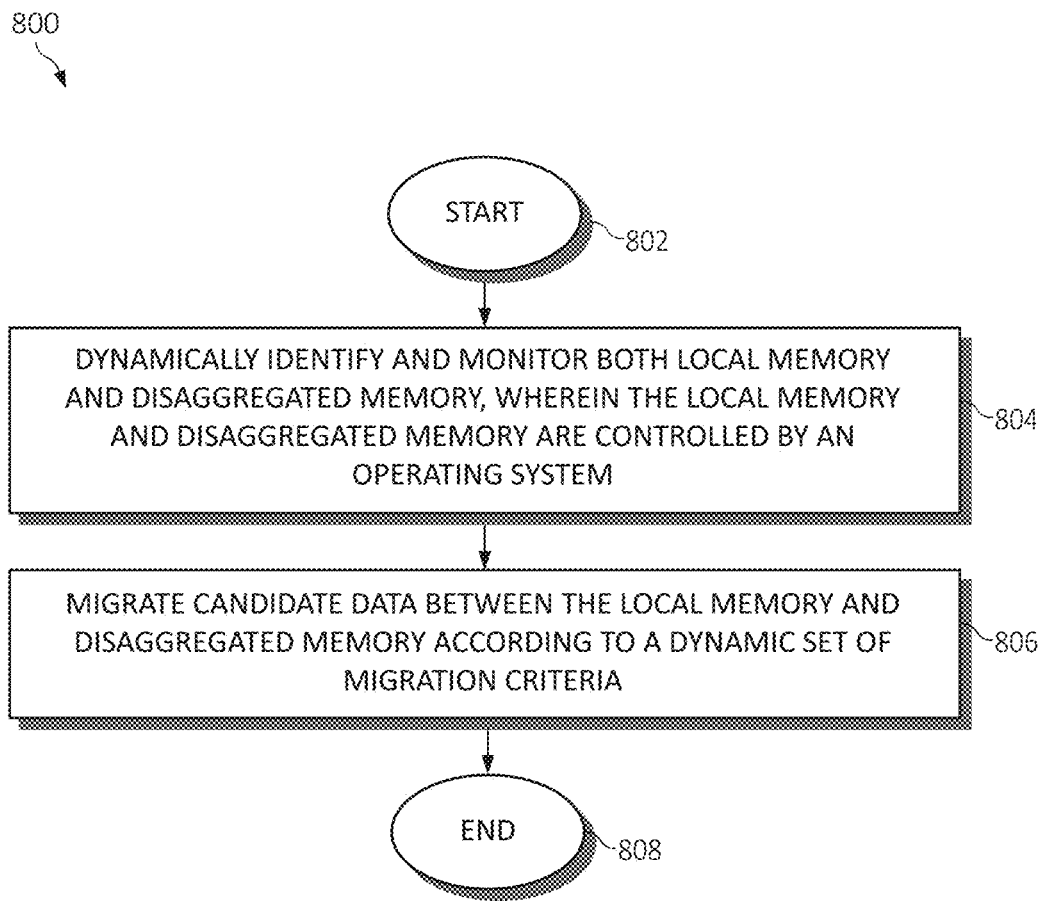
FIG. 8 is a flowchart diagram depicting an exemplary method for integrating and improving performance of disaggregated memory in a computing environment, by a processor, in which aspects of the present invention may be realized.

Turning now to FIG. 8, a method 800 for integrating disaggregated memory in a computing environment using a processor is depicted, in which various aspects of the illustrated embodiments may be implemented. The functionality 800 may be implemented as a method (e.g., a computer-implemented method) executed as instructions on a machine, where the instructions are included on at least one computer readable medium or one non-transitory machine-readable storage medium. The functionality 800 may start in block 802.

Local memory and disaggregated memory may be identified and monitored for integrating disaggregated memory in a computing system, as in block 804. Candidate data may be migrated between the local memory and disaggregated memory according to a dynamic set of migration criteria, as in block 806. The functionality 800 may end, as in block 808.

In one aspect, in conjunction with and/or as part of at least one blocks of FIG. 8, the operations of method 800 may include each of the following. The operations of 800 may migrate the candidate data between different memory tiers of the local memory or the disaggregated memory and may balance the candidate data between the local memory and disaggregated memory based on access frequency of the candidate data. The local memory and the disaggregated memory include a variety of memory types and performance characteristics.

The operations of 800 may minimize a performance penalty of the disaggregated memory by migrating the candidate data from the disaggregated memory to the local memory. The operations of 800 may control the local memory and disaggregated memory by an operating system and rank available memory domains associated with the local memory and disaggregated memory based on the dynamic set of migration criteria.

The operations of 800 may determine computational performance from each of the local memory and disaggregated memory based on migrating the candidate data between the local memory and disaggregated memory, wherein the dynamic set of migration criteria includes at least access frequency, access latency, and performance characteristics, collect feedback information from the local memory and the disaggregated memory, and initialize a machine learning mechanism to adjust the dynamic set of migration criteria based on the feedback information.

Figure 9:
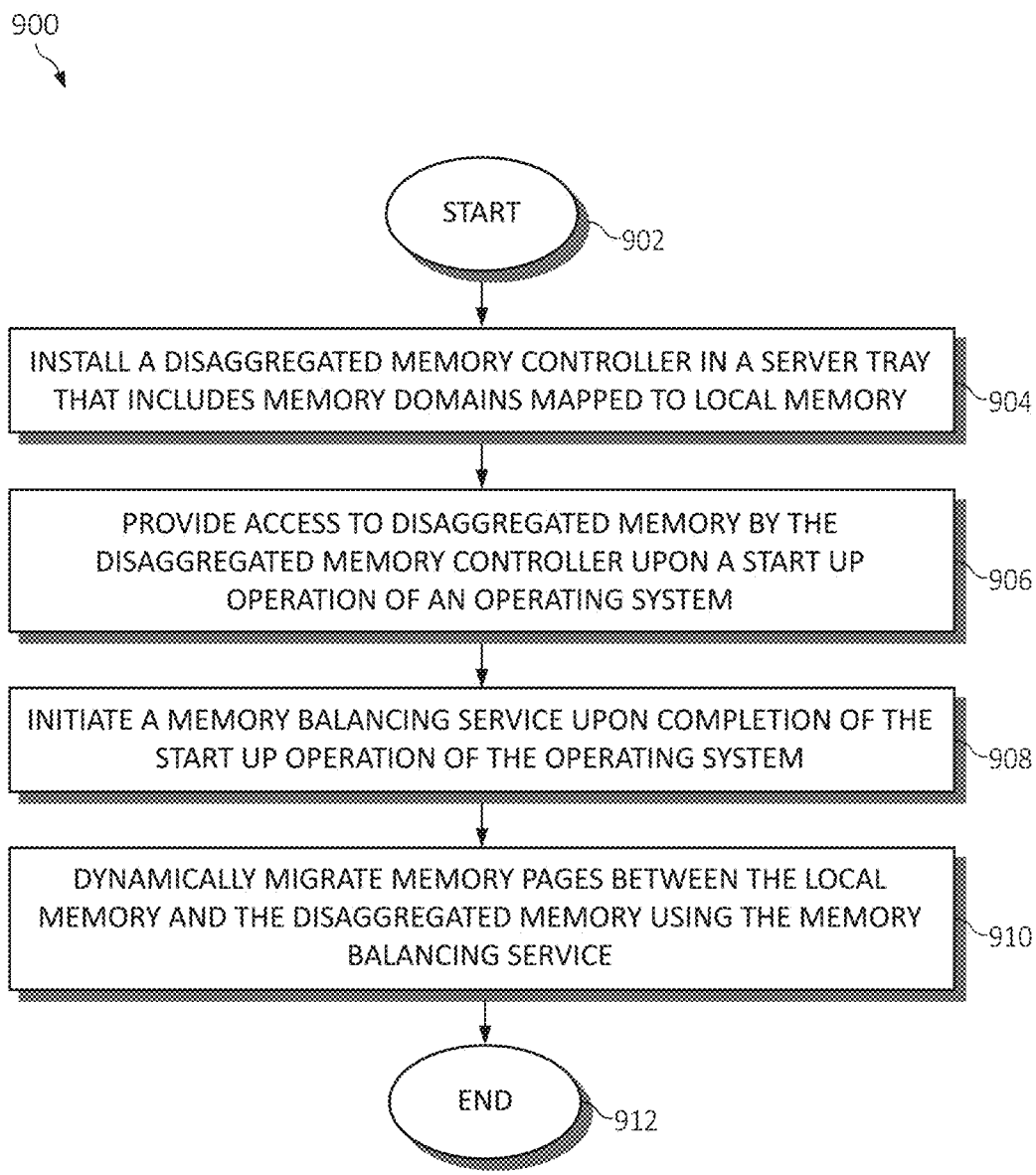
FIG. 9 is an additional flowchart diagram depicting an exemplary method for integrating and improving performance of disaggregated memory in a computing environment, by a processor, in which aspects of the present invention may be realized.

Turning now to FIG. 9, a method 900 for initializing disaggregated memory for integration in a computing environment using a processor is depicted. The functionality 900 may be implemented as a method (e.g., a computer-implemented method) executed as instructions on a machine, where the instructions are included on at least one computer readable medium or one non-transitory machine-readable storage medium. The functionality 900 may start in block 902.

A disaggregated memory controller may be initialized initialized, active, and/or installed) in a server tray that includes memory domains mapped to local memory, as in block 904. Access to disaggregated memory may be provided by the disaggregated memory controller upon a startup operation of an operating system, as in block 906, A memory balancing service may be initiated upon completion of the startup operation of the operating system, as in block 908. Memory pages may be dynamically migrated between the local memory and the disaggregated memory using the memory balancing service, as in block 910. The functionality 900 may end, as in block 912.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The descriptions of the embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for integrating disaggregated memory in a cloud computing environment by one or more processors comprising:
   initiating boot of a physical server having disaggregated memory as part of a cloud computing infrastructure and local memory associated with an operating system (OS) of the physical server;
   during initialization of the OS, exposing the disaggregated memory to the OS using a disaggregated memory controller residing within the physical server by creating one or more disaggregated memory domains of the physical server by the disaggregated memory controller, wherein the one or more disaggregated memory domains are initially assigned only a selected amount of memory to successfully allocate mandatory OS data structures for managing a memory domain as a hybrid memory domain between the local memory and the disaggregated memory, wherein the disaggregated memory is attached to the one or more disaggregated memory domains subsequent to the creation of the one or more disaggregated memory domains and prior to the OS completing the boot, and wherein a memory balancing service is initiated as the OS completes the boot of the physical server;
   responsive to completing the boot and initializing the memory balancing service, dynamically identifying and monitoring both the local memory associated with the OS and the disaggregated memory; and
   migrating candidate data between the local memory associated with the OS and the disaggregated memory according to a dynamic set of migration criteria, wherein the migration is performed transparently to the OS by integrating the disaggregated memory with a kernel non-uniform memory access (NUMA) architecture associated with the OS.

2. The method of claim 1, further including migrating the candidate data between different memory tiers of the local memory or the disaggregated memory, wherein the local memory and the disaggregated memory include a plurality of memory types and performance characteristics.

3. The method of claim 1, further including balancing the candidate data between the local memory and the disaggregated memory based on access frequency of the candidate data.

4. The method of claim 1, further including minimizing a performance penalty of the disaggregated memory by migrating the candidate data from the disaggregated memory to the local memory.

5. The method of claim 1, further including controlling the local memory and the disaggregated memory by an operating system.

6. The method of claim 1, further including ranking available memory domains associated with the local memory and the disaggregated memory based on the dynamic set of migration criteria.

7. The method of claim 1, further including:
   determining computational performance from each of the local memory and the disaggregated memory based on migrating the candidate data between the local memory and disaggregated memory, wherein the dynamic set of migration criteria includes at least access frequency, access latency, and performance characteristics;
   collecting feedback information from the local memory and the disaggregated memory; and
   initializing a machine learning mechanism to adjust the dynamic set of migration criteria based on the feedback information.

8. A system for integrating disaggregated memory in a computing environment, comprising:
   one or more computers with executable instructions that when executed cause the system to:
   initiating boot of a physical server having disaggregated memory as part of a cloud computing infrastructure and local memory associated with an operating system (OS) of the physical server;
   during initialization of the OS, expose the disaggregated memory to the OS using a disaggregated memory controller residing within the physical server by creating one or more disaggregated memory domains of the physical server by the disaggregated memory controller, wherein the one or more disaggregated memory domains are initially assigned only a selected amount of memory to successfully allocate mandatory OS data structures for managing a memory domain as a hybrid memory domain between the local memory and the disaggregated memory, wherein the disaggregated memory is attached to the one or more disaggregated memory domains subsequent to the creation of the one or more disaggregated memory domains and prior to the OS completing the boot, and wherein a memory balancing service is initiated as the OS completes the boot of the physical server;

responsive to completing the boot and initializing the memory balancing service, dynamically identify and monitor both the local memory associated with the OS and the disaggregated memory; and migrate candidate data between the local memory associated with the OS and the disaggregated memory according to a dynamic set of migration criteria, wherein the migration is performed transparently to the OS by integrating the disaggregated memory with a kernel non-uniform memory access (NUMA) architecture associated with the OS.

9. The system of claim 8, wherein the executable instructions when executed cause the system to migrate the candidate data between different memory tiers of the local memory or the disaggregated memory, wherein the local memory and the disaggregated memory include a plurality of memory types and performance characteristics.

10. The system of claim 8, wherein the executable instructions when executed cause the system to balance the candidate data between the local memory and the disaggregated memory based on access frequency of the candidate data.

11. The system of claim 8, wherein the executable instructions when executed cause the system to minimize a performance penalty of the disaggregated memory by migrating the candidate data from the disaggregated memory to the local memory.

12. The system of claim 8, wherein the executable instructions when executed cause the system to control the local memory and the disaggregated memory by an operating system.

13. The system of claim 8, wherein the executable instructions when executed cause the system to rank available memory domains associated with the local memory and the disaggregated memory based on the dynamic set of migration criteria.

14. The system of claim 8, wherein the executable instructions when executed cause the system to:
determine computational performance from each of the local memory and disaggregated memory based on migrating the candidate data between the local memory and the disaggregated memory, wherein the dynamic set of migration criteria includes at least access frequency, access latency, and performance characteristics;
collect feedback information from the local memory and the disaggregated memory; and
initialize a machine learning mechanism to adjust the dynamic set of migration criteria based on the feedback information.

15. A computer program product for integrating disaggregated memory in a computing environment, the computer program product comprising:
one or more computer readable storage media, and program instructions collectively stored on the one or more computer readable storage media, the program instruction comprising:
program instructions to initiate boot of a physical server having disaggregated memory as part of a cloud computing infrastructure and local memory associated with an operating system (OS) of the physical server;

program instructions to, during initialization of the OS, expose the disaggregated memory to the OS using a disaggregated memory controller residing within the physical server by creating one or more disaggregated memory domains of the physical server by the disaggregated memory controller, wherein the one or more disaggregated memory domains are initially assigned only a selected amount of memory to successfully allocate mandatory OS data structures for managing a memory domain as a hybrid memory domain between the local memory and the disaggregated memory, wherein the disaggregated memory is attached to the one or more disaggregated memory domains subsequent to the creation of the one or more disaggregated memory domains and prior to the OS completing the boot, and wherein a memory balancing service is initiated as the OS completes the boot of the physical server;

program instructions to, responsive to completing the boot and initializing the memory balancing service, dynamically identify and monitor both the local memory associated with the OS and the disaggregated memory; and program instructions to migrate candidate data between the local memory associated with the OS and the disaggregated memory according to a dynamic set of migration criteria, wherein the migration is performed transparently to the OS by integrating the disaggregated memory with a kernel non-uniform memory access (NUMA) architecture associated with the OS.

16. The computer program product of claim 15, further including program instructions to:
migrate the candidate data between different memory tiers of the local memory or the disaggregated memory, wherein the local memory and the disaggregated memory include a plurality of memory types and performance characteristics; and
balance the candidate data between the local memory and the disaggregated memory based on access frequency of the candidate data.

17. The computer program product of claim 15, further including program instructions to minimize a performance penalty of the disaggregated memory by migrating the candidate data from the disaggregated memory to the local memory.

18. The computer program product of claim 15, further including program instructions to control the local memory and the disaggregated memory by an operating system.

19. The computer program product of claim 15, further including program instructions to rank available memory domains associated with the local memory and the disaggregated memory based on the dynamic set of migration criteria.

20. The computer program product of claim 15, further including program instructions to:
determine computational performance from each of the local memory and the disaggregated memory based on migrating the candidate data between the local memory and the disaggregated memory, wherein the dynamic set of migration criteria includes at least access frequency, access latency, and performance characteristics;
collect feedback information from the local memory and the disaggregated memory; and initialize a machine learning mechanism to adjust the dynamic set of migration criteria based on the feedback information.

\* \* \* \* \*